(12) United States Patent
Serak et al.

(10) Patent No.: US 11,378,229 B2
(45) Date of Patent: Jul. 5, 2022

(54) INSTALLATION HINGE AND INSTALLATION METHOD

(71) Applicant: Axis AB, Lund (SE)

(72) Inventors: Pavel Serak, Prague (CZ); Stepan Sejbal, Prague (CZ)

(73) Assignee: AXIS AB, Lund (SE)

(*) Notice: Subject to any disclaimer, the term of this patent is extended or adjusted under 35 U.S.C. 154(b) by 141 days.

(21) Appl. No.: 17/025,384

(22) Filed: Sep. 18, 2020

(65) Prior Publication Data

US 2021/0088178 A1 Mar. 25, 2021

(30) Foreign Application Priority Data

Sep. 23, 2019 (EP) .................................... 19198946

(51) Int. Cl.
*F16M 11/10* (2006.01)
*F16M 13/02* (2006.01)
*F16M 11/04* (2006.01)

(52) U.S. Cl.
CPC .......... *F16M 13/02* (2013.01); *F16M 11/046* (2013.01); *F16M 11/10* (2013.01)

(58) Field of Classification Search
CPC ...... F16M 11/10; F16M 13/02; Y10S 248/923
USPC ...................................................... 248/282.1
See application file for complete search history.

(56) References Cited

U.S. PATENT DOCUMENTS

| 7,175,146 B2* | 2/2007 | Kim ....................... F16M 11/10 211/100 |
| 7,445,187 B2* | 11/2008 | Shin ...................... F16M 11/10 248/324 |
| 8,482,906 B2* | 7/2013 | Farley, Jr. ............. F16M 13/02 49/260 |
| 9,036,347 B2* | 5/2015 | Kuo ....................... F16M 11/38 361/679.59 |
| 9,182,078 B1 | 11/2015 | Cheng |
| 2002/0179801 A1 | 12/2002 | Kim |
| 2006/0125360 A1* | 6/2006 | Kim ....................... F16M 13/02 312/405.1 |

(Continued)

FOREIGN PATENT DOCUMENTS

WO 2011/099999 A1 8/2011

OTHER PUBLICATIONS

Extended European Search Report dated Apr. 3, 2020 for the European Patent Application No. 19198946.6.

*Primary Examiner* — Bradley Duckworth
(74) *Attorney, Agent, or Firm* — Volpe Koenig

(57) ABSTRACT

An display installation hinge includes pivot arms extending from a lower portion of a housing, for enabling pivoting between an open position in which the pivot arms may engage with the display, and a closed position in which the display has been moved to a closed position in relation to the wall-mounted housing. The pivot arms have a distal free end configured to engage with the display, wherein a proximal end of the pivot arms is associated with a pivot axis. The installation hinge further comprises a physical guide configured to support the display when the display is in engagement with the pivot arms in the open position, so as to prevent it from moving down the pivot arms. The physical guide is configured to release the support as the pivot arms are in the closed position, enabling for the display to travel further down the pivot arms.

12 Claims, 3 Drawing Sheets

(56) References Cited

U.S. PATENT DOCUMENTS

| | | | |
|---|---|---|---|
| 2009/0057513 A1* | 3/2009 | Wu | F16M 11/10 248/231.91 |
| 2009/0057514 A1* | 3/2009 | Oh | F16M 13/02 248/282.1 |
| 2009/0127425 A1* | 5/2009 | Frazer | G06F 1/1601 345/173 |
| 2010/0207006 A1* | 8/2010 | Kim | F16M 11/10 248/284.1 |
| 2019/0387193 A1* | 12/2019 | Kang | F16M 11/28 |

* cited by examiner

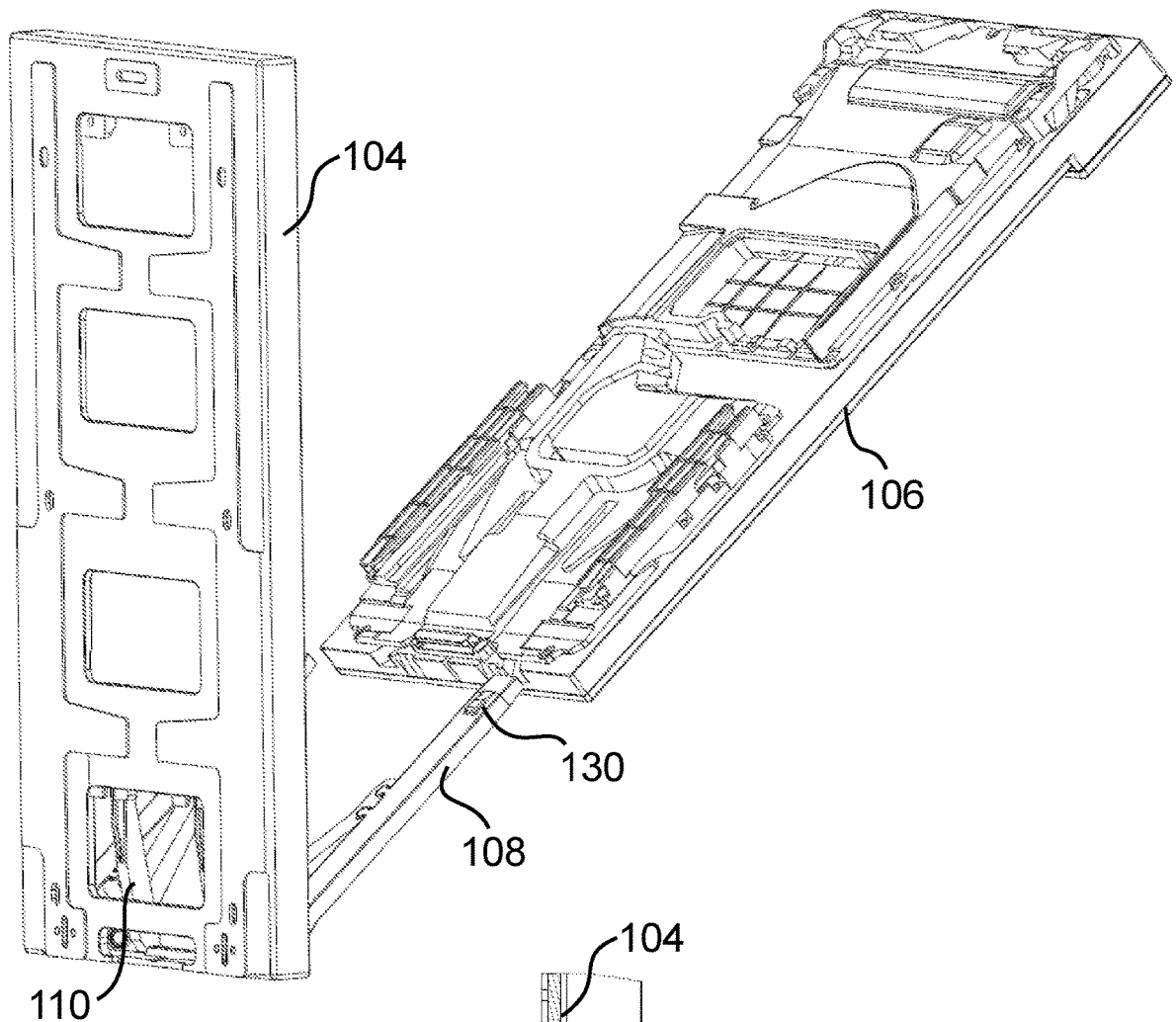
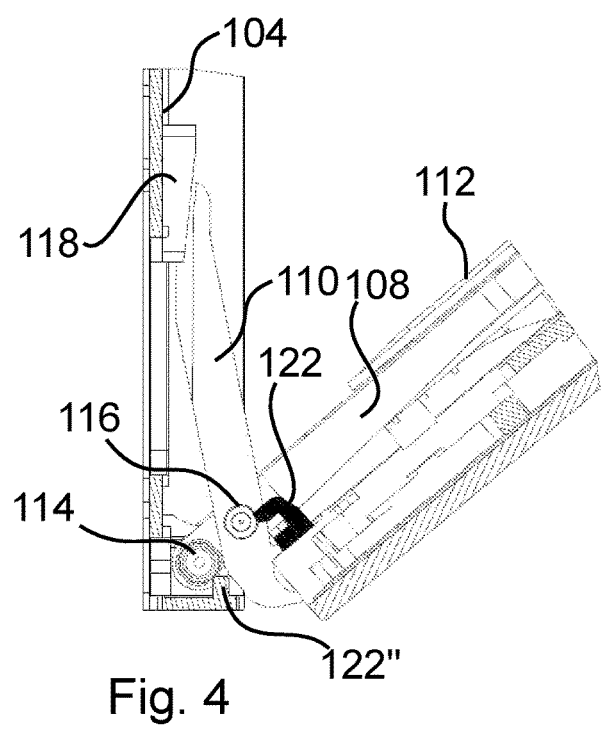
Fig. 5
Fig. 4

INSTALLATION HINGE AND INSTALLATION METHOD

TECHNICAL FIELD

The present invention relates to a hinge arrangement, and in particular a hinge arrangement tailormade for use in relation to an installation method. The invention also relates to a wall-mounted housing comprising an installation hinge, as well as to an intercom device.

BACKGROUND

Many modern devices providing an interface between a user and a computerized system consist of a housing and a display. The display will typically provide the actual interface, and may comprise a touch-screen of some sort, possibly an image or video display etc. For aesthetic reasons, as well as for practical reasons, the entire display may be covered by a single glass surface. As such, the display may be associated with a considerable cost and some weight. The housing may be wall-mounted, i.e. attached to a wall, and it may comprise electronics for driving the display, a control unit or CPU for signal processing, a communication module etc. In an installation situation the wall-mounted housing is attached to a wall by suitable fastening means, after which the display is electrically connected to the housing and thereafter physically connected to the same.

The position of the mounted interface device will be convenient for users, yet the step of connecting the display electronically once the housing has been mounted to a wall will present a cumbersome portion of the installation. The display, which is heavy, expensive, and fragile, will have to be held in place while the electrical connections are effected, and typically the length of the cabling should be minimized due to space constraints.

Eliminating, or at least alleviating the above installation issues is greatly desired.

SUMMARY

According to a first aspect is embodied an installation hinge for installing a display to a wall-mounted housing. The installation hinge comprises pivot arms extending from a lower portion of the wall-mounted housing, and configured to enable pivoting between an open position in which the pivot arms may engage with the display, and a closed position in which the display arranged in the pivot arms has been moved to a closed position in relation to the wall-mounted housing. The pivot arms further have a distal free end, which is configured to engage with the display, while a proximal end of the pivot arms is associated with a pivot axis. The installation hinge further comprises a physical guide configured to support (a lower end of) the display when the display is in engagement with the pivot arms in the open position, so as to prevent it from moving down the pivot arms. The physical guide is configured to release the support as the pivot arms are in the closed position, enabling for the display to travel further down the pivot arms.

The described type of hinge will enable for a multi-step motion pattern during installation of a first part to a second part, in the present case for installation of a display to a wall-mounted housing. The physical guide will make it easy for a person making the installation to perform the required actions in the correct order. Firstly, arranging a display on the pivot arms, secondly performing any electrical installation, connecting cables of the housing with the display, or vice versa, thirdly moving the display to a closed position, and fourthly allowing for the display to travel further down the pivot arms, to finalize an installation procedure. The pivot arms, exemplified as attachment arms in the detailed description, may be configured to enable pivoting simply by being suspended in a pivot axis, such as a hinge barrel or similar, and they may be configured to engage with the display in one of numerous ways all including that the arms may be attached to the display in one of many ways, preferably in a way enabling simple coupling between the arms and the display. The use of the wording that the display will travel further down the pivot arms signifies that it may travel further along the arms in a direction away from the free end of the pivot arms.

In one or more embodiments the physical guide may be pivotally attached to the pivot arms, and pivotally attached to the wall-mounted housing. Having the physical guide attached to both the movable pivot arms and the housing will enable for the physical guide to support and stabilize the arrangement, and also for the process of releasing the support of the display to be effected by means of a purely mechanical procedure (to be further explained in the detailed description), and in one possible embodiment the physical guide is further configured to release its support as the pivot arms are folded so far in towards the closed position that an engagement arrangement of the display overlaps with a mating engagement arrangement of the wall-mounted housing. The engagement arrangement is a further locking arrangement that assists in further securing the display to the housing. To understand this feature it may be important to remember that the release from the physical guide will enable for the display to travel further down onto the pivot arms. The feature ensures that once the display is allowed to travel further onto the pivot arms it may be caught by the engagement arrangement.

In the embodiments presented herein the engagement arrangement is configured to secure the display to the wall-mounted housing. The engagement arrangement may comprise several elements over the area of the display, so as to ensure a secure localization of the display onto the housing.

In one or several embodiments the pivot arms may be prevented from rotating beyond a predetermined opening angle by means of a rotation stop, the predetermined angle preferably being within an interval allowing for any desired electrical connection of the display to be effected. In this way the person performing the installation may arrange the display on the pivot arms, and the rotation stop enables for the display to be held by the pivot arms without any risk of being released unintentionally. Consequently, the person performing the installation may have both arms free for performing the electrical connection between the display and the housing.

In one or more embodiments the pivot arms have snap-locks (example illustrated in FIG. 1 and FIG. 5 at 130) for engagement between the pivot arms and the display, so as to prevent the display from releasing from the pivot arms involuntarily. Using snap-locks provides an additional safety measure adding to the one provided by the rotation stops.

In some embodiments the physical guide is a support arm, pivotally attached to a corresponding pivot arm close to a distal end of the support arm, and with a proximal end coupled to the wall-mounted housing with a suspension allowing pivotal and translational motion along the wall mount parallel to a plane in which the pivot arms are configured to pivot. The use of a support arm is a straightforward manner to provide properties of robustness and support ability, and the nature of the suspension to the housing may allow for full range of motion and performance.

In one or more embodiments the pivot arm is a two-part arm, with an arm part arranged on either side of a hinge barrel and with a junction position between the proximal end and the distal end. This construction facilitates assembly of the pivot arm to the housing. For further simplification of the assembly a junction between the two arm parts may be effected by means of a dovetail type joint, enabling for the two arm parts being joined after having been associated with a hinge barrel providing the pivot axis. The dovetail-type joint may be assembled without use of any further means, such as adhesive or screws, simply by snapping the two parts together. The junction may of course be reinforced by such means, if desired.

A second aspect relates to a wall-mounted housing, comprising an installation hinge according to the first aspect. The engagement arrangement of the display may be configured to interact with the engagement arrangement of the wall-mounted housing in such a way that the display is forced towards the wall-mounted housing as the display is translated downwards in relation to the wall-mounted housing. This means that after the display has been arranged in the upright position (direction referring to a normal installation where the housing is mounted upright on a vertical wall), it may be pushed downwards. When this is done, and the display is forced towards the housing, a further seal between the two components may be effected.

The wall mounted housing may comprise screw openings for screws arranged to lock a closed position of the display.

The present teachings may also be embodied as an intercom device comprising an installation hinge and a wall mounted housing according to what has already been described and according to what will be described later in the description.

Yet another aspect relates to a method for arranging a display onto a wall-mounted housing using the installation hinge of description found herein. The method comprises, arranging the display on the pivot arms of the installation hinge, coupling any electrical connections between the housing and the display, e.g. for power transfer or data transfer, folding the display upwards to a first closed position, translating the display downwards to a fully closed position, and optionally securing the display in the fully closed position, e.g. by means of screws.

Hence, it is to be understood that the present concepts are not limited to the particular steps of the methods described or component parts of the systems described, as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

FIG. 4 is a partial sectional sideview illustrating an installation hinge of an embodiment.

FIG. 5 is a perspective view from behind of an intercom similar to the one of FIG. 1, illustrating a step of arranging a display on the installation hinge.

DETAILED DESCRIPTION OF EMBODIMENTS

The present teachings will now be described more fully hereinafter with reference to the accompanying drawings, in which currently preferred embodiments are shown. This teachings may, however, be embodied in many different forms and should not be construed as limited to the embodiments set forth herein; rather, these embodiments are provided for thoroughness and completeness, and to fully convey the scope to the skilled person.

Figure 1:
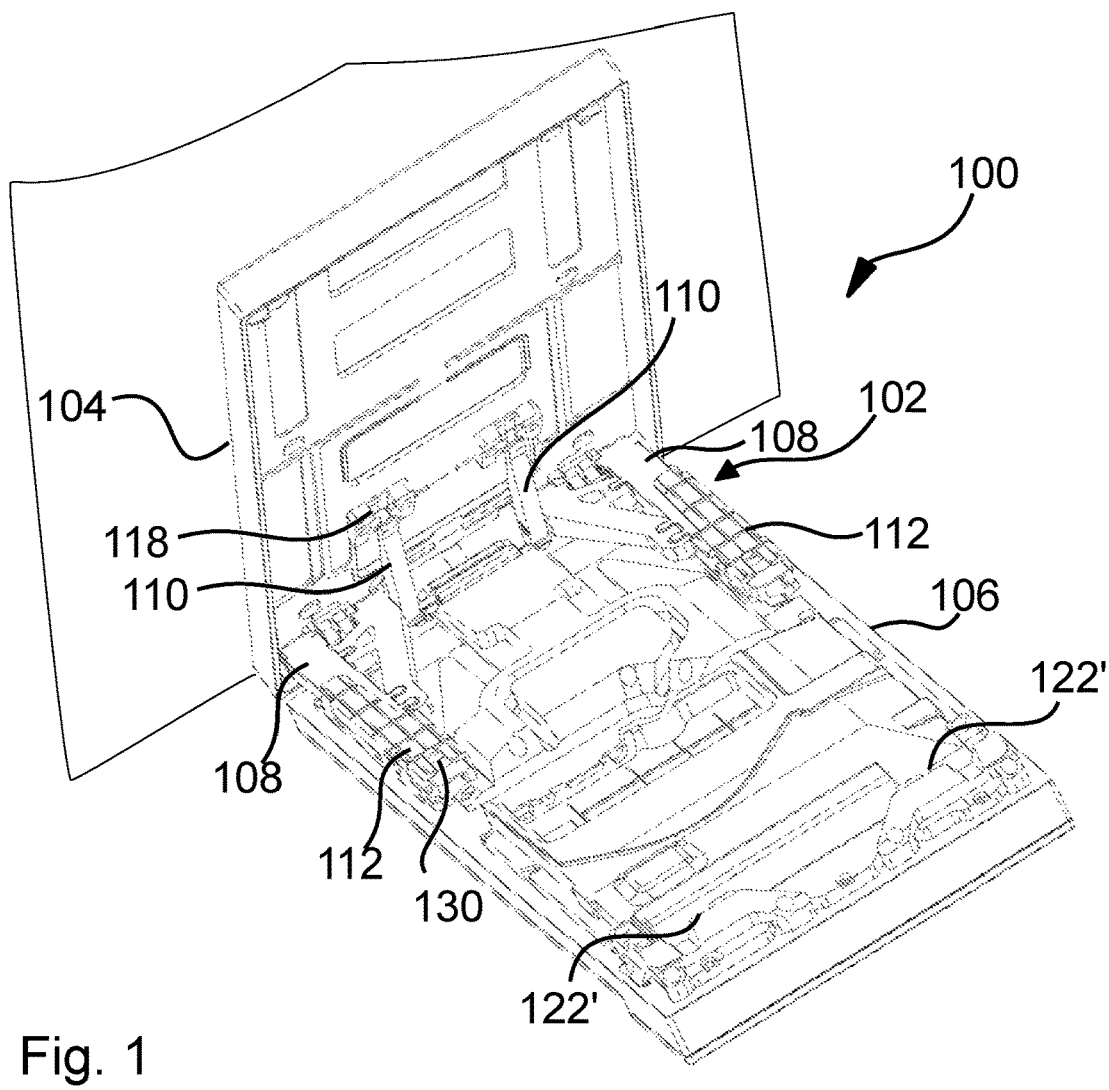
FIG. 1 is a perspective view of an intercom device having an installation hinge in accordance with a first embodiment.

FIG. 1 is a perspective view of an intercom 100 comprising a hinge 102 in accordance with a first embodiment. There is a wall-mounted housing 104, with a display 106 attached to it. The arrangement is shown at an angle from above, with the installation hinge 102 arranged at the lower end thereof. The display 106 is connected to the wall-mounted housing 104 via the hinge, which will now be described in some more detail. In its present embodiment the hinge 102 is a two-arm arrangement with two pivot arms 108 supporting the display, one at each side of the wall-mounted housing. In other embodiments the number of arms may differ, and as an example it could vary with the expected load for a particular application. FIG. 1 includes further reference numerals, referring to elements that will be described at a later point of the description.

Figure 2:
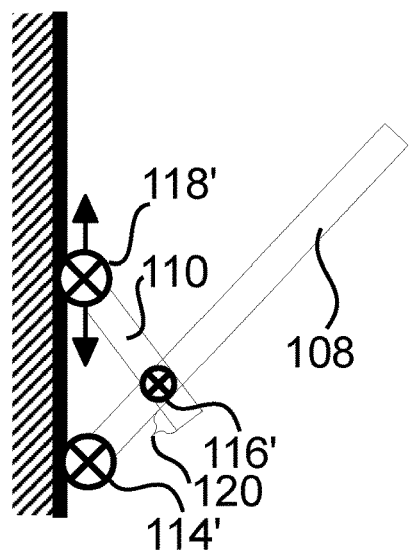
FIGS. 2 and 3 are schematical side views illustrating an installation hinge in two different operational states.
Figure 3:
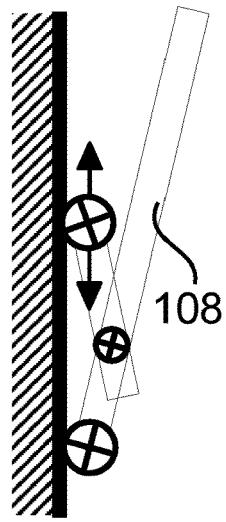

FIGS. 2 and 3 are schematic side views of the hinge, the explanation of which may enable a fuller understanding of the more complex views. The same reference numerals are used for the same element in the different drawings. The hinge 102 comprises an attachment arm 108 and a support arm 110, the latter functioning as a physical guide configured to support the display 106, and to carry some of its weight as well as guiding how it will be arranged on the attachment arm. Each arm 108, 110 has a hinged end and a free end. The free end, also referred to as the distal end, of the attachment arm 108 is configured to be received in a slot 112 (see FIG. 1) of the display 106, while the hinged end, also referred to as the proximal end, connects to a hinge barrel 114. For the purposes of the present description the reference numeral 114 will denote the hinge barrel, while 114' will denote a pivot axis enabled by cooperation between the hinge barrel 114 and the attachment arm. The same logic is used for other elements/axes in the description. The support arm 110 is pivotally attached to the attachment arm 108 at a position 116 (providing a pivot axis 116') between the hinged end and the free end, and the free end of the support arm is configured to support the display 106 from below. The hinged end of the support arm 110 is arranged to slide up and down in its hinge barrel 118 so as not to obstruct pivotal movement of the attachment arm 108, and consequently it is not suspended in a standard hinge barrel and the corresponding axis 118' will shift position in the process of folding the hinge 102. In the view of FIG. 3 the attachment arm has been pivoted upwards, e.g. in an action of folding the display attached thereto into a position in which it is arranged in close relation to the wall-mounted housing. As clearly visible from comparing FIG. 2 and FIG. 3 an effective amount 120 of the free end of the support arm 110 extending beyond the attachment arm 108 will be reduced as the attachment arm is folded upwards. In the fully upright position, corresponding to the display 106 having been folded completely to a closed position in relation to the wall-mounted housing 104, there is no significant portion of the support arm extending beyond the constraints of the attachment arm. It is readily understood that the portion of the support arm 110 extending beyond the attachment arm may be used as a physical guide and by interaction with a portion of the display it may prevent the display from sliding down further onto the attachment arm 108. Once the attachment arm 108 has been folded up towards the housing 104 far enough that no or almost no portion of the support arm 110 extends beyond the constraints of the attachment arm 108, the display 106 is no longer prevented from sliding down the attachment arm 108 and into the housing 104. In the present embodiment the interaction between the support arm and the display is mechanical, and from the design of the different parts of the installation hinge and the cooperation with the display, the moment at which the support will cease may be predictably designed.

FIG. 4 is a partial sectional sideview of a mounted installation hinge, also illustrating an example of a locking element 122 arranged on the display and a ledge 122" in the housing 104 with which it may cooperate. In the view it is also clearly visible how the pivot axes 114', 116' are shifted in relation to each other. The locking arrangement 122, 124 is utilized in the final stages of closing, and how it is utilized will be described in the following.

The construction as described above enables for a multi-stage closing of the display 106. In the first stage, the display 106 may be slid onto the attachment arm 108 (or arms—which would be the most common embodiment, with two arms in the embodiment of FIG. 1). The perspective view of FIG. 5 illustrates a moment immediately before the display 106 has been arranged onto the arms 108. Following the insertion, the support arms 110 will support the display 106 from below. At the same time, they will prevent the display from sliding all the way down onto the attachment arm. As the display is moved towards a closed position it will be fully supported until it reaches the closed position, or at least close thereto. At this position, the support will disappear, and the display may slide down a bit further, which is an effect that may be utilized as will be exemplified in the following.

For this example, reference is made to FIG. 1, and some additional elements will be described. There are further cooperating locking elements 122' arranged on the display and the housing respectively. The elements of the housing that will cooperate with the locking elements 122/122' are not shown, but their design is straightforward, and may in a simple embodiment be provided by means of a ledge over which the locking elements fit. The further locking elements 122' have essentially the same function as the locking elements 122 referred to in FIG. 4, yet they are situated at an upper portion of the display. The locking elements 122, 122' are configured to engage following a translational motion, such as the display being moved downwards in relation to the housing, which is readily understood from the drawings. In the embodiment of FIG. 1, the locking elements 122/122' of the display are embodied as plastic profiles having a tapered engagement surface such that the display will be forced towards the housing as the display is moved downwards in relation to the housing. Other materials than plastic could of course be used for this part, yet when the properties of plastic satisfies the requirements of the products expected performance it is a convenient material to use. The feature that the display will be pulled towards the housing will facilitate an adequate seal between the wall-mounted housing and the display. Furthermore, as the support arm releases its support of the display, it is beneficial if the locking elements of the housing and the display are in an overlapping position. The tapered surface of the locking element enables for this overlap to be realized prior to the display having reached the fully closed position. Overlapping implies that even when the support from the support arms ceases, the locking element will engage when the display translates downwards. Adding to the locking elements 122' visible in FIG. 1 and 122 illustrated in FIG. 4, there may be additional locking elements of similar or different construction in other locations of the arrangement, such as in a lower portion thereof (as illustrated in FIG. 4), and/or along the edges. It is to be understood that the same function may be achieved by many other means. As a first alternative, the material may not be plastic, but another polymer, a composite, metal, etc., i.e. as long as the material suits the purpose in regard of stability and durability the particular material is not essential.

Figure 6:
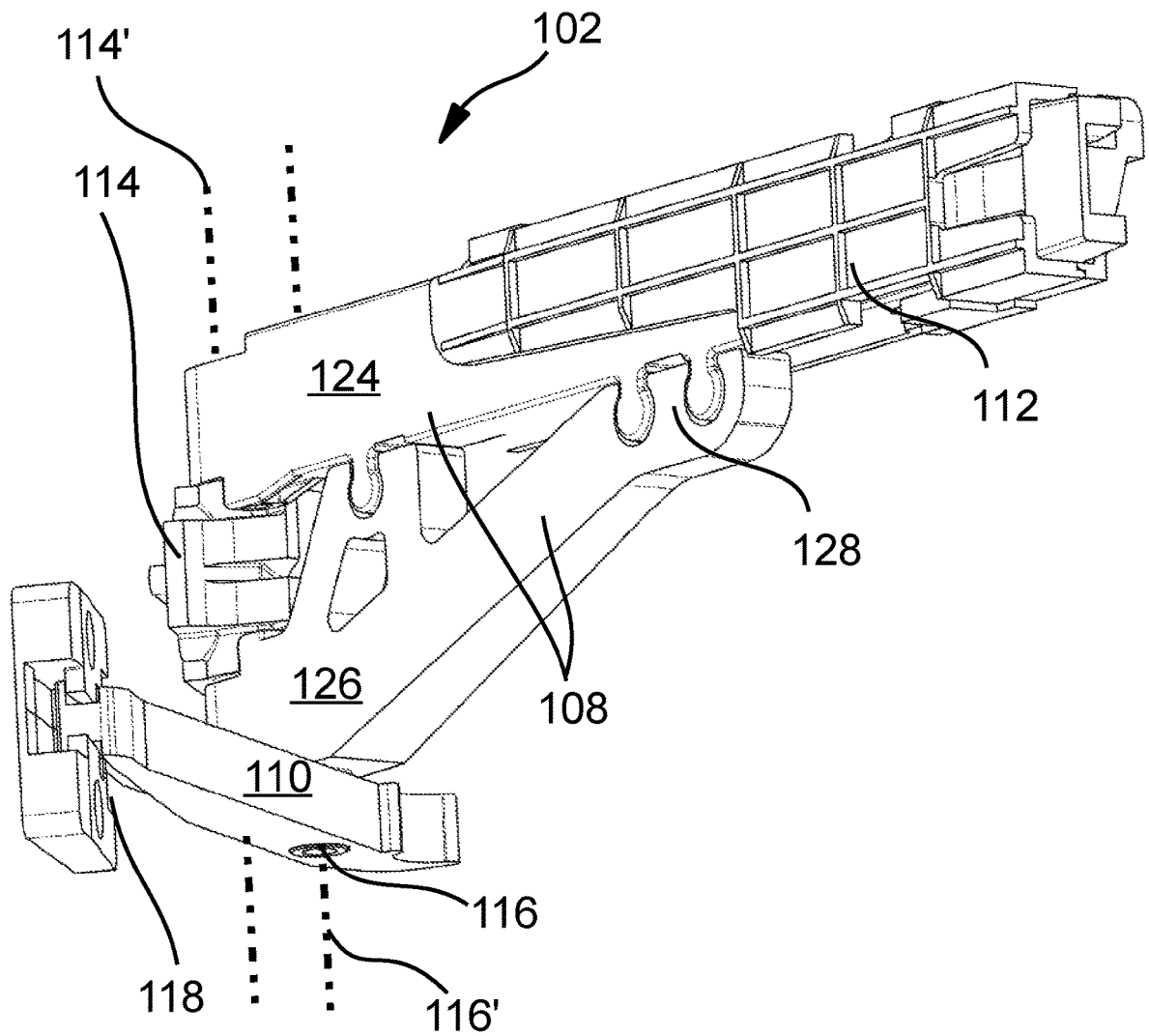
FIG. 6 is a perspective view from above of an installation hinge similar to the one of FIG. 4.

For increased stability of the hinge, the lateral position of the pivot axes 114', 116' may be shifted in relation to each other, as is visible in FIGS. 1 and 4, and is further illustrated in FIG. 6, showing the details of one embodiment of the hinge. The attachment arm 108 may comprise two separate parts 124 and 126 enabling a simplified assembly process. The two parts are inserted from either side of a hinge barrel 114 arranged on the housing and may then be attached to each other by means of a dovetail type joint, or puzzle joint 128 in a simple manner (matingly fitting undercut portions), like two pieces of a puzzle. This alternative is very convenient if the axis 114' or part of the axis is formed by a portion of the first or second part of the attachment arm, or both for that matter. If the rotational axis 114' is a separate physical part inserted through the attachment arm and the hinge barrel 114 the attachment arm 108 may instead be formed by a single element. The puzzle joint or other types of dovetail type joints are very convenient, since it may be easily assembled. The joint may be strengthened by an adhesive, and the skilled person realizes that many other alternative joints may be used instead of a dovetail-type joint, such as screws, adhesive, etc.

An element 118 corresponding to a hinge barrel of the support arm has a slot in which one end of the support arm may both slide and rotate, while still being localized securely to fulfil its purpose to support and guide the support arm 110 in its pivotal motion. Thus, the support arm 110 may rotate around the axis 118' and slide up and down in the hinge barrel 118, but not move sideways or perpendicular to the housing 104. In the illustrated example, a pivot axis 116' for engagement of the support arm with the attachment arm is formed as a part of the attachment arm, and the support arm may be snapped onto this pivot axis. In the view of FIG. 6 (or FIG. 4 for that matter) it is visible how the end of the support arm extending beyond position 116 of the pivot axis 116', i.e. the portion of the support arm actually supporting the display during an assembly procedure, has an intricate design. Several other designs of the end may be possible, depending on the type of behavior as the hinge pivots, the type of contact with the display, etc. For the present embodiment, it is only the tip of the support arm that will engage with the display, and the rest of the support arm is designed not to obstruct motion during closing of the display. Not shown in the drawings is that a surface or element of the display cooperating with the support arm may have a sloping design, such that once the support arm has released its engagement, it may readily resume engagement should the display be returned to an open position. Thus, it may be seen that the hinge 102 will assist the installer not only during initial installation of the display, but also during opening and closing in later maintenance or repair work.

In the present design, the support arm 110 has an added purpose of stabilizing the installation hinge, and therefore the added functionality of supporting the display is a clever way of supplying an extra feature with a minor constructional addition. There are, however, several other ways of obtaining a similar functionality in more or less intricate ways. The support could be provided by an electromechanical device, suggestively arranged in the display, and preventing the attachment arm from entering the display fully until a predetermined position is reached. In another alternative example a spring biased element of the attachment arm, blocking the downward translation of the display, could interact with an element of the housing in such a way that the spring-biased element is pushed out of the way as the display reaches its closed position. This would not provide a stabilizing function, yet it would be a way of providing an installation hinge according to the disclosure of the independent claim as filed, without utilizing a support arm. Furthermore, in the present embodiment the support arm interacts with a lower portion of the display, yet it could equally well interact with an element inside the display and depending on the shape of such element and its surroundings, the shape of the support arm could vary.

It will be appreciated that a person skilled in the art can modify the above described embodiments in many ways and still use the advantages as shown in the embodiments above.

In particular, the present installation hinge has been described in close relation to a display and a wall-mounted housing. However, the installation hinge could equally well be disclosed as a separate part, where related operational parts described as parts of the wall-mounted housing and/or the display forms part of the installation hinge instead.

Additionally, variations to the disclosed variants can be understood and effected by the skilled person in practicing the teachings, from a study of the drawings, the disclosure, and the appended claims.

The invention claimed is:

1. An installation hinge for installing a display to a wall-mounted housing, wherein the installation hinge comprises:
   pivot arms extending from a lower portion of the wall-mounted housing, and configured to enable pivoting between an open position in which the pivot arms may engage with the display, and a closed position in which the display arranged on the pivot arms has been moved to a closed position in relation to the wall-mounted housing,
   the pivot arms further having a distal free end configured to engage with the display, wherein a proximal end of the pivot arms is associated with a pivot axis,
   wherein the installation hinge further comprises a physical guide configured to support the display when the display is in engagement with the pivot arms in the open position, so as to prevent it from moving down fully onto the pivot arms,
   wherein the physical guide is configured to release the support as the pivot arms are in the closed position, enabling for the display to travel further down the pivot arms.

2. The installation hinge of claim 1, wherein the physical guide is pivotally attached to the pivot arms, and pivotally attached to the wall-mounted housing.

3. The installation hinge of claim 1, wherein the physical guide is further configured to release its support as the pivot arms are folded so far in towards the closed position that an engagement arrangement of the display overlaps with a mating engagement arrangement of the wall-mounted housing.

4. The installation hinge of claim 3, wherein the engagement arrangements are configured to secure the display to the wall-mounted housing.

5. The installation hinge of claim 1, wherein snap-locks are arranged for engagement between the pivot arms and the display, so as to prevent the display from releasing from the pivot arms involuntarily.

6. The installation hinge of claim 1, wherein the physical guide is a support arm, pivotally attached to a corresponding pivot arm close to a distal end of the support arm, and with a proximal end coupled to the wall-mounted housing with a suspension allowing pivotal and translational motion along the wall mount parallel to a plane in which the pivot arms are configured to pivot.

7. The installation hinge of claim 1, wherein the pivot arm is a two-part arm, with an arm part arranged on either side of a hinge barrel at the pivot axis and with a junction position between the proximal end and the distal end.

8. The installation hinge of claim 7, wherein a junction between the two arm parts is effected by means of a dovetail type joint, for joining the two arm parts to each other after the two arm parts have been associated with the hinge barrel providing the pivot axis.

9. A wall-mounted housing, including an installation hinge comprising:
   pivot arms extending from a lower portion of the wall-mounted housing, and configured to enable pivoting between an open position in which the pivot arms may engage with the display, and a closed position in which the display arranged on the pivot arms has been moved to a closed position in relation to the wall-mounted housing,
   the pivot arms further having a distal free end configured to engage with the display, wherein a proximal end of the pivot arms is associated with a pivot axis,
   wherein the installation hinge further comprises a physical guide configured to support the display when the display is in engagement with the pivot arms in the open position, so as to prevent it from moving down fully onto the pivot arms,
   wherein the physical guide is configured to release the support as the pivot arms are in the closed position, enabling for the display to travel further down the pivot arms.

10. The wall-mounted housing of claim 9, wherein the wall-mounted housing is configured to engage the display in such a way that the display is forced towards the wall-mounted housing as the display is translated downwards in relation to the wall-mounted housing.

11. The wall-mounted housing of claim 9 wherein the installation hinge comprises an intercom device.

12. A method for arranging a display in a wall-mounted housing using an installation hinge, the installation hinge comprising: pivot arms extending from a lower portion of the wall-mounted housing, and configured to enable pivoting between an open position in which the pivot arms may engage with the display, and a closed position in which the display arranged on the pivot arms has been moved to a closed position in relation to the wall-mounted housing, the pivot arms further having a distal free end configured to engage with the display, wherein a proximal end of the pivot arms is associated with a pivot axis, wherein the installation hinge further comprises a physical guide configured to support the display when the display is in engagement with the pivot arms in the open position, so as to prevent it from moving down fully onto the pivot arms, wherein the physical guide is configured to release the support as the pivot arms are in the closed position, enabling for the display to travel further down the pivot arms; the method comprising:
   arranging the display on the pivot arms of the installation hinge, coupling any electrical connections between the display and the housing, e.g. for power transfer or data transfer,
   folding the display upwards to a first closed position, translating the display downwards to a fully closed position.

* * * * *